UNITED STATES PATENT OFFICE.

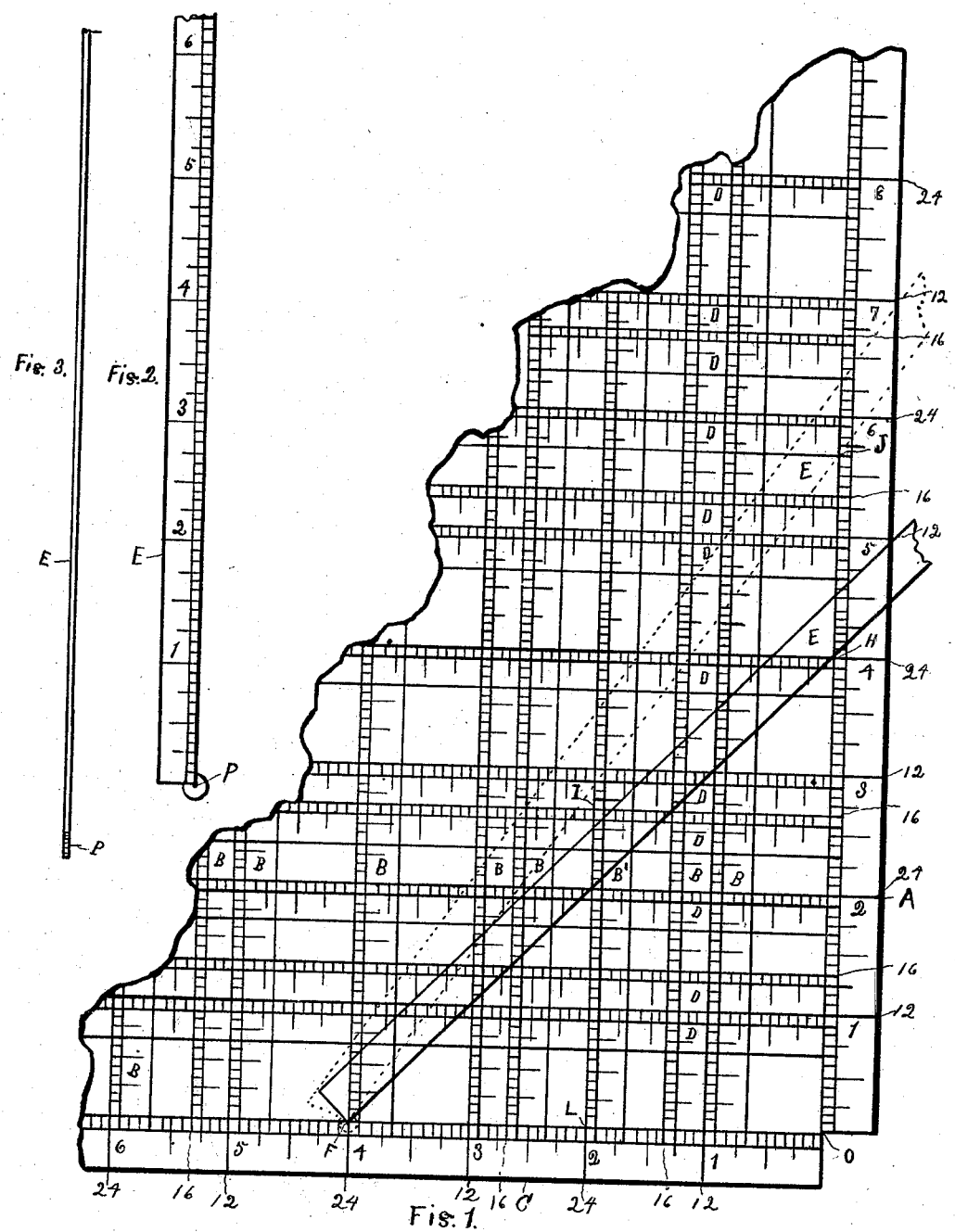

FLETCHER NOLF, OF MOOREPARK, MICHIGAN.

ANGLE-MEASURE FOR BUILDERS.

SPECIFICATION forming part of Letters Patent No. 717,257, dated December 30, 1902.

Application filed February 8, 1902. Serial No. 93,150. (No model.)

*To all whom it may concern:*

Be it known that I, FLETCHER NOLF, a citizen of the United States, residing at Moorepark, in the county of St. Joseph, State of Michigan, have invented a new and useful Angle-Meter for Builders, set forth in the annexed specification.

The object of this invention is to construct what I term an "angle-meter for builders," designed to aid in the finding of lengths, cuts, and miters of rafters.

The angle-meter consists in general of a chart of any proper material bearing printed characters and of a transparent rule separate from the chart to be used in connection with the same, all as particularly set forth in the following description and the drawings.

In the accompanying drawings, forming a part of this specification, Figure 1 is a broken part of the chart in plan view; Fig. 2, a broken plan of the transparent rule, and Fig. 3 is an edge view of Fig. 2 looking from a point at the right.

Referring to the parts of the drawings pointed out by letters, A is a plumb-line scale, printed on the chart in a position understood to be vertical, and C is a level-line scale, printed on the chart in a position understood as horizontal or level. This plumb-line scale A and the level-line scale C form a right angle, like a carpenter's square, and in form and as to the characters they show printed on them are designed as an imitation of said style of square. They are divided off into inches of twelve spaces to the inch and are so marked. The design is in making the chart that it shall be of a size that both the plumb-line scale A and the level-line scale C shall be both twenty-four inches long; but the chart being here shown broken away for convenience only a little over eight inches is represented on the plumb-line scale A and a little over six inches on the level-line scale C. At the scale the chart is drawn, twelve spaces or an inch represents one foot in actual measurements.

In Fig. 1 the numerals "12," "16," and "24" at the side of the plumb-line scale A and the like numerals below the level-line scale C are termed "twelve," "sixteen," and "twenty-four" inch centers, explained below. These numerals will be printed on the chart itself when it is manufactured, but are placed on the drawing-sheet here to avoid confusion.

To aid in the measurements, I have printed on the chart imitation scale-bars B B', running parallel with each other and the plumb-line scale A, and imitation scale-bars D, running parallel with each other and the level-line scale C. These imitation scale-bars B', B, and D are graduated into spaces and inches the same as the plumb-line scale A and the level-line scale C and are on the same scale of an inch to the foot; but no figures are placed on the drawings to point out the inches to avoid confusion, but will be so placed in the manufactured chart. These imitation scale-bars B', B, and D are located at the twelve, sixteen, and twenty-four inch centers of the plumb-line and level-line scales A and C, at the latter of which are the zero of measurement for the former. As said former are printed, they appear to be transparent, so that the under ones appear to show through the upper where they cross each other.

The order of locating the imitation scale-bars B' B D and the inch-centers 12, 16, and 24 is as follows. Starting at the lower end of the plumb-line scale A and at the right-hand end of the level-line scale C, the first of the imitation scale-bars B', B, and D are placed at one inch or twelve spaces and are at the first twelve-inch centers, and hence "12" is marked at these points; the second at sixteen spaces and are at the first sixteen-inch centers, and hence "16" is marked at these points; the third at twenty-four spaces and are at the first twenty-four-inch centers, and hence "24" is marked at these points. These are also the second twelve-inch centers.

It should be understood that the twelve-inch centers as a matter of fact, the way they are used, are twelve spaces apart, the sixteen-inch centers sixteen spaces between them, and the twenty-four-inch centers twenty-four spaces apart; but, to continue the order of placing, the fourth are at thirty-two spaces and at the second sixteen-inch centers, and hence "16" is marked at these points; the fifth are at thirty-six spaces and at the third twelve-inch centers, and hence "12" is marked at these points; the sixth at forty-eight spaces and are at the second twenty-four inch centers, and hence "24" is marked at these points.

These are also the points of the fourth twelve-inch centers and the third sixteen-inch centers. This order is repeated for every four inches. At the two-inch points the centers here may be designated by printing on the chart "12" and "24" for inch-centers, for such is a fact, in lieu of printing simply the "24," as also may the centers be marked at the four-inch points "12" "16" "24," for these facts are understood by the user whether the extra numerals appear at the two-inch point and the four-inch point or not. These twelve, sixteen, and twenty-four inch centers, representing the same number of spaces as correspond with said numerals, are in common use with builders, and the repeating of the order here given for every four inches is for the convenience of the users of the chart. These centers are used by builders to designate the distance from the center of one timber to the center of another. For instance, in the case of rafters placed at twenty-four-inch centers indicates that it is twenty-four-inches from the center of one to the center of another.

In Fig. 2 is shown the transparent rule E, broken away at the upper end. It is divided off into inches, with twelve spaces to the inch, and bears characters the same as those on the plumb-line scale A and the level-line scale C. This rule is made separate from the chart. It is shown placed on the chart at E in Fig. 1 as when in use. No marks or characters are shown on the rule in Fig. 1. To avoid confusion, those appearing as though shining through are on the imitation scale-bars B', B, and D and the plumb-line scale A. In the edge view of the rule E in Fig. 3 are shown fulcrum-points P for forcing into the chart when in use to hold it in the position desired. There is to be one of these fulcrum-points at each end and one at the center on the under side.

The following is an example explaining the use of the angle-meter: Suppose the roof plan of upright to be eight by twenty-four, the wing eight by eight, and the pitch of the roof to be forty-five degrees. Measurements are line measurements, and hence deductions must be made for headings or ridges according to the thickness of material. To find the length of principal rafter, set the fulcrum-point P at the end of the transparent rule E on the level-line scale C at a point representing half the width of the building, which in this case is four feet, or at F; place the other end of the rule E at H on the plumb-line scale A. Thus the rule is located at an angle of forty-five degrees, the pitch required. The length of the principal rafter is indicated on the rule E from F to H. To find cut of principal rafter, the rule E, remaining in the same position, F to O on the level-line scale C is the level or horizontal cut and O to H on the plumb-line scale A is the upright or vertical cut. To find the length, cut, and miter of the valley-rafter, leave the fulcrum-point P at the lower end of the rule E at F on the level-line scale C undisturbed and swing said rule to J in Fig. 1 on the plumb-line scale, this position of the rule being here shown in dotted lines. From F to O on level-line scale C is the length of the valley-rafter, from O to J on the plumb-line scale A is the level cut, and O to F on the level-line scale C is the plumb-line or vertical cut. From O to J on the plumb-line scale A, given above as the level cut, is also the miter-cut of valley-rafter, and in this case is the length of the principal rafter as well.

The length of the jack-rafters is given on the imitation scale-bar B', said bar being at the first twenty-four-inch center on the level-line scale C, said length being from L to I. The vertical and level cuts of the jack-rafters are the same as those of the principal rafters.

The above shows a use and operation of the angle-meter. To give all of the many uses is not deemed necessary even if it were possible, but I design to print on circulars of instruction, to accompany the angle-meters when disposed of, a sufficient number to familiarize builders with their use and mode of operation.

The division of distances given on the plumb-line scale A, the level-line scale C, th imitation scale-bars B, B', and D, and on the transparent rule E, may be changed, and in said case the scale adopted as well, to suit wishes and convenience.

Having thus described my invention, what I claim as new, and desire to secure by Letters Patent of the United States of America, is—

An angle-meter for builders, comprising a chart bearing a representation of a plumb-line scale and a level-line scale located at right angles to each other, and having their inner edge graduated in like spaced distances in succession, and with marked centers in conformity with the graduation of said distances on the plumb-line scale and the level-line scale; and bearing imitation scale-bars graduated at the edge in the same successive spaced distances, placed parallel with each other and with the level-line scale, and having their graduated edge at the centers of the plumb-line scale; like imitation scale-bars placed parallel with each other and with plumb-line scale and having their graduated edge at the centers of the level-line scale, and a transparent rule in like distances as the scale-bars and the plumb-line and the level-line scales, made separate from the chart, and provided with fulcrum-points for forcing into the chart, substantially as set forth.

In testimony of the foregoing I have hereunto set my hand in the presence of two witnesses.

FLETCHER NOLF.

Witnesses:
SHEA C. WEST,
R. G. WEST.